(12) United States Patent
Araki et al.

(10) Patent No.: US 8,730,155 B2
(45) Date of Patent: May 20, 2014

(54) OPERATION DEVICE HAVING FEATURES TO ASSIST A USER IN PROPERLY MANIPULATING BUTTONS THEREOF

(75) Inventors: Takamasa Araki, Tokyo (JP); Ken Yano, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 98 days.

(21) Appl. No.: 12/784,834

(22) Filed: May 21, 2010

(65) Prior Publication Data

US 2010/0302140 A1    Dec. 2, 2010

(30) Foreign Application Priority Data

Jun. 1, 2009 (JP) ................................. 2009-132010

(51) Int. Cl.
*G06F 3/033* (2013.01)
(52) U.S. Cl.
USPC .......................................................... 345/156
(58) Field of Classification Search
USPC .......................................................... 345/156
See application file for complete search history.

(56) References Cited

U.S. PATENT DOCUMENTS

| | | | |
|---|---|---|---|
| 5,923,317 A | 7/1999 | Sayler et al. | |
| 7,488,254 B2 | 2/2009 | Himoto et al. | |
| 7,931,535 B2 | 4/2011 | Ikeda et al. | |
| 2002/0098887 A1* | 7/2002 | Himoto et al. | 463/37 |
| 2003/0083114 A1* | 5/2003 | Lavin et al. | 455/569 |
| 2005/0233808 A1 | 10/2005 | Himoto et al. | |
| 2006/0022942 A1* | 2/2006 | Lin | 345/157 |
| 2006/0071908 A1 | 4/2006 | Rehbock | |
| 2006/0118706 A1 | 6/2006 | Hisakawa et al. | |
| 2006/0197754 A1 | 9/2006 | Keely et al. | |
| 2007/0052177 A1 | 3/2007 | Ikeda et al. | |
| 2007/0060391 A1* | 3/2007 | Ikeda et al. | 463/46 |
| 2007/0117625 A1 | 5/2007 | Marks et al. | |
| 2008/0153593 A1 | 6/2008 | Ikeda et al. | |
| 2011/0172016 A1 | 7/2011 | Ikeda et al. | |

FOREIGN PATENT DOCUMENTS

| | | |
|---|---|---|
| CN | 1213103 A | 4/1999 |
| CN | 1782971 A | 6/2006 |
| CN | 1919389 A | 2/2007 |
| EP | 0835676 A1 | 4/1998 |
| JP | 8165826 A | 6/1996 |
| JP | 11088482 A | 3/1999 |
| JP | 2007054114 A | 3/2007 |

(Continued)

OTHER PUBLICATIONS

Chinese Office Action for corresponding Chinese Patent Application No. 2010-10194941.5, Jul. 26, 2011.

(Continued)

*Primary Examiner* — Jonathan Boyd
(74) *Attorney, Agent, or Firm* — Matthew B. Dernier, Esq.; Gibson & Dernier LLP

(57) ABSTRACT

Provided is an operation device to be held by a user with one hand when used. The operation device includes: a recessed portion formed at a position at which at least one of a thumb and fingers is placed when the user holds the operation device; and a main button which is disposed at a bottom of the recessed portion and has a top surface adjacent to a rim portion forming a side surface of the recessed portion.

9 Claims, 4 Drawing Sheets

(56) References Cited

FOREIGN PATENT DOCUMENTS

| JP | 0003141271 U | 4/2008 |
|----|--------------|--------|
| JP | 2009047856 A | 3/2009 |
| TW | 200709831 A  | 3/2007 |

OTHER PUBLICATIONS

European Search Report for corresponding European Patent Application No. 10005587.0, Aug. 18, 2011.

Japanese Office Action for corresponding Japanese Patent Application No. 2009-132010, Apr. 26, 2011.

Office Action for corresponding Japanese Patent Application No. 2009-132010, dated Mar. 21, 2012.

Office Action for corresponding Chinese Patent Application No. 201010194941.5, dated May 18, 2012.

Office Action for corresponding Taiwanese Patent Application No. 099117020, dated Nov. 23, 2012.

Office Action for corresponding Chinese Patent Application No. 201010194941.5, dated Dec. 13, 2012.

* cited by examiner

OPERATION DEVICE HAVING FEATURES TO ASSIST A USER IN PROPERLY MANIPULATING BUTTONS THEREOF

BACKGROUND OF THE INVENTION

1. Field of the Invention

The present invention relates to an operation device to be held by a user in their hand when used.

2. Description of the Related Art

Various kinds of operation devices that are used for operating information processing apparatuses have been proposed. Those operation devices include an operation device to be held by a user in their hand when used, such as a controller for a video game console (see US 2007/0117625).

In a case where a button for operation input is provided on a surface of such an operation device, if the button is provided at a position at which the user places their thumb or finger when the user holds the operation device with their hand, the user does not need to move their thumb or finger onto the button every time they depresses the button, which results in easier operation. However, if the user holds the operation device with their thumb or finger placed on the button, there is a higher risk of erroneous operation in which the user depresses the button inadvertently.

SUMMARY OF THE INVENTION

The present invention has been made in view of the above-mentioned circumstances, and has an object to provide an operation device including an operation button which is easy to operate and unlikely to cause erroneous operation when the user uses the operation device by holding the operation device with their hand.

According to the present invention, there is provided an operation device to be held by a user with one hand when used, including: a recessed portion formed at a position at which at least one of a thumb and fingers is placed when the user holds the operation device; and a first button which is disposed at a bottom of the recessed portion and has a top surface adjacent to a rim portion forming a side surface of the recessed portion.

The operation device may further include a second button disposed at a position opposite to the first button on a surface of the operation device, at which another one of the thumb and fingers of the user other than the at least one of the thumb and fingers is to be placed.

Further, the second button may include a button capable of detecting an amount by which the second button is depressed by the user.

Further, the operation device may further include another button which is disposed at a periphery of the recessed portion and used along with the first button.

Further, the other button which is disposed at a periphery of the recessed portion may be disposed at a position which corresponds to an end of the recessed portion in a longitudinal direction.

DETAILED DESCRIPTION OF THE INVENTION

Hereinbelow, with reference to the drawings, detailed description is given of an embodiment of the present invention.

Figure 1:
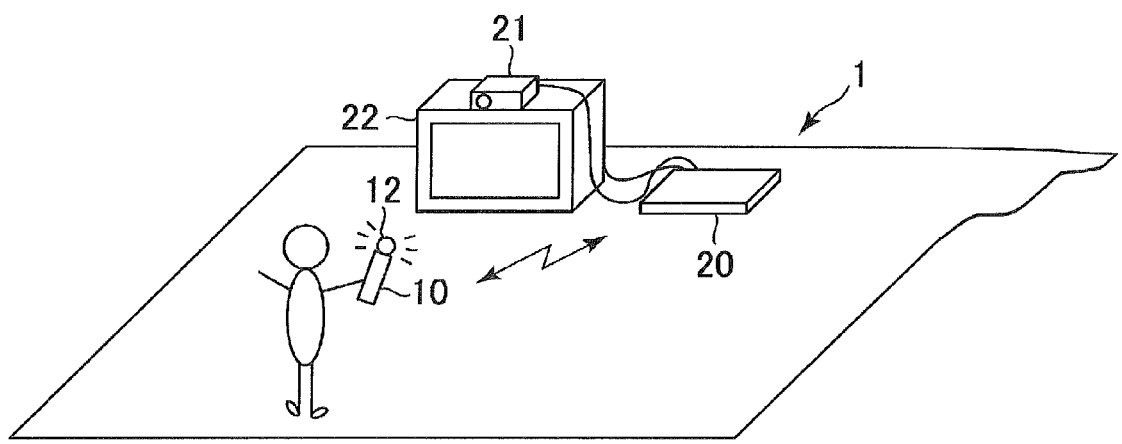
FIG. 1 is a schematic diagram illustrating a use example of an operation device according to an embodiment of the present invention.

FIG. 1 is a schematic diagram illustrating a use situation of an information processing system 1 including an operation device 10 according to the embodiment of the present invention. As illustrated in FIG. 1, the information processing system 1 includes the operation device 10 to be held by a user with their hand when used, and an information processing apparatus 20. The information processing apparatus 20 is, for example, a video game console, a personal computer, or the like, and is connected to an image capture apparatus 21 and a display apparatus 22.

The operation device 10 is capable of establishing communication with the information processing apparatus 20 via a wireless communication interface compliant with, for example, the Bluetooth standard. The user of the information processing system 1 holds the operation device 10 with their hand to operate a button or the like provided on the operation device 10. In response to such an operation, content of the operation performed by the user is transmitted to the information processing apparatus 20 via the wireless communication interface. Further, in this embodiment, the operation device 10 includes a light emitting portion 12, and the light emitting portion 12 emits light according to an instruction from the information processing apparatus 20. The information processing apparatus 20 uses the image capture apparatus 21 to capture an image of the light emitted from the light emitting portion 12. Then, the information processing apparatus 20 analyzes the captured image to thereby identify a position of the operation device 10 which is viewed from the image capture apparatus 21. With this configuration, the user can perform operation input to the information processing apparatus 20 not only by operating a button or the like provided to the operation device 10, but also by moving the operation device 10 itself.

Hereinbelow, description is given of a configuration of the operation device 10 according to this embodiment.

Figure 2:
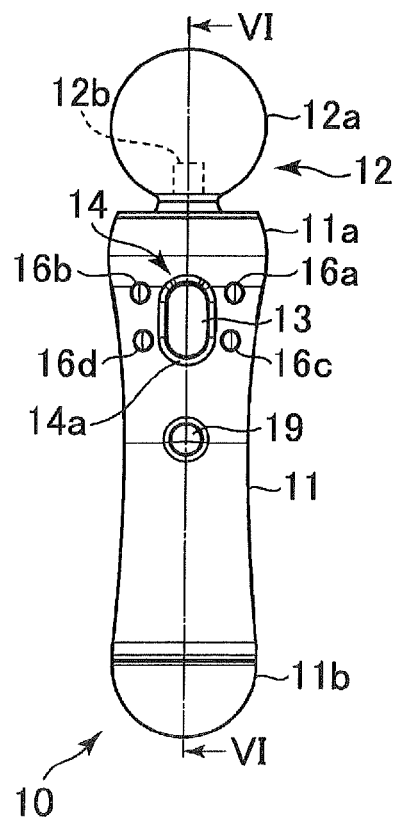
FIG. 2 is a front view of the operation device according to the embodiment of the present invention.
Figure 3:
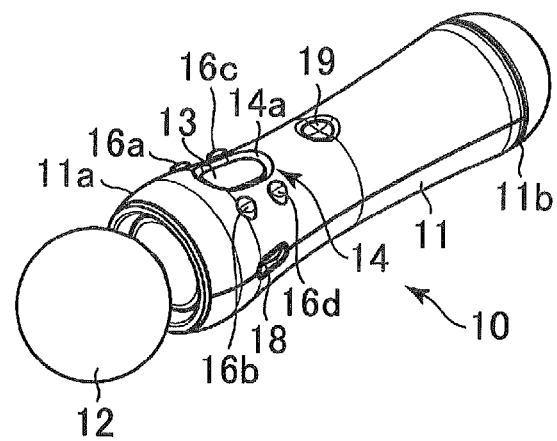
FIG. 3 is a perspective view of the operation device according to the embodiment of the present invention when viewed from a front side thereof.
Figure 4:
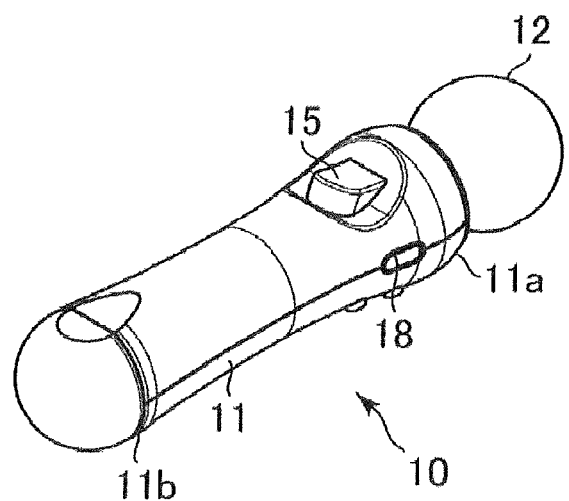
FIG. 4 is a perspective view of the operation device according to the embodiment of the present invention when viewed from a back side thereof.
Figure 5:
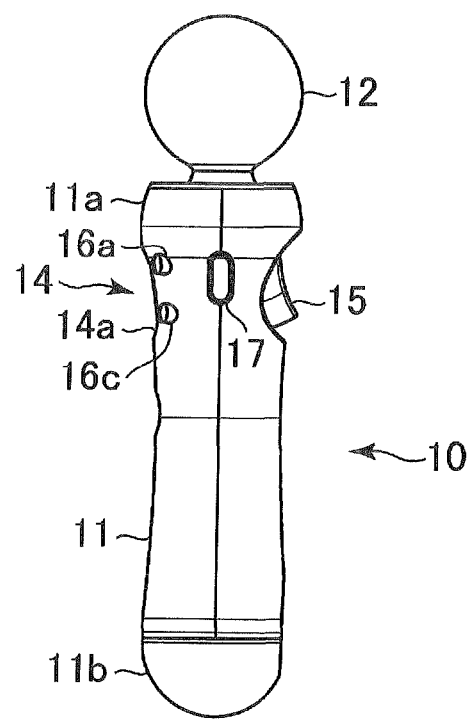
FIG. 5 is a right side view of the operation device according to the embodiment of the present invention.
Figure 6:
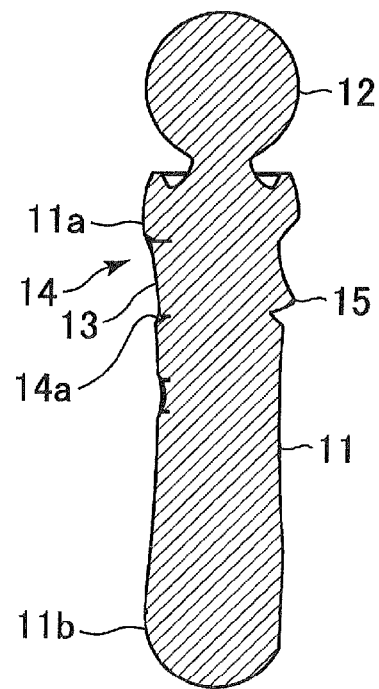
FIG. 6 is a sectional view of the operation device according to the embodiment of the present invention.

FIGS. 2 to 5 are diagrams each illustrating an outer appearance of the operation device 10. FIG. 2 is a front view of the operation device 10. FIG. 3 is a perspective view of the operation device 10 when viewed from a front side thereof. FIG. 4 is a perspective view of the operation device 10 when viewed from a back side thereof. FIG. 5 is a right side view of the operation device 10. Further, FIG. 6 is a sectional view of the operation device 10 which is taken along a line VI-VI of FIG. 2. As illustrated in FIGS. 2 to 6, the operation device 10 includes a main body portion 11 and the light emitting portion 12, and the main body portion 11 is provided with a plurality of buttons on a surface thereof. The user holds the main body portion 11, and performs the operation input in which the user depresses the buttons with their thumb and fingers. Those buttons are described later in detail.

The main body portion 11 is formed in a cylindrical shape as a whole, and has the light emitting portion 12 attached at one end thereof. The surface of the cylindrical column forming the main body portion 11 is gently incurved toward the vicinity of the center in a longitudinal direction thereof. With this configuration, a portion in the vicinity of the center of the main body portion 11 is narrower than portions at both ends thereof. Conversely, at both ends of the main body portion 11, protruding portions 11a and 11b that protrude outward compared to the portion in the vicinity of the center of the main body portion 11 are respectively formed.

The light emitting portion 12 includes a spherical-shaped outer shell 12a formed of a light transmissive material, such as a silicone resin, and a plurality of LEDs 12b disposed thereinside. In this embodiment, three LEDs 12b corresponding to the three primary colors of light each emit light with an intensity corresponding to an instruction from the information processing apparatus 20, thereby enabling the light emitting portion 12 to emit light with various colors. The image capture apparatus 21 captures an image of the light emitted from the light emitting portion 12, and accordingly, the information processing apparatus 20 identifies a direction of the operation device 10 with respect to the image capture apparatus 21. In addition, based on a size of light of the light emitting portion 12 in the captured image, a distance from the image capture apparatus 21 to the operation device 10 is calculated. Based on such information regarding the direction and the distance of the operation device 10, the information processing apparatus 20 performs various kinds of information processing. With this configuration, by holding and moving the operation device 10 with their hand, the user can perform the operation input to the information processing apparatus 20.

Note that inside the main body portion 11, various kinds of detection means for detecting attitude and movement of the operation device 10, such as an acceleration sensor, a gyroscope, and a geomagnetic sensor, may be provided. By combining the position and the size of the light emitting portion 12 in the captured image obtained by the image capture apparatus 21, using information output by such detection means, it is possible to identify the attitude and the movement of the operation device 10 with more accuracy.

Further, the one end of the main body portion 11 to which the light emitting portion 12 is attached has a larger diameter than the outer shell 12a in a cross section perpendicular to the longitudinal direction of the main body portion 11. Specifically, when the operation device 10 is viewed from above, the perimeter of the protruding portion 11a appears as surrounding the perimeter of the outer shell 12a. Further, as described above, the portion in the vicinity of the center of the main body portion 11 which is to be held by the user is formed to be narrower than the protruding portion 11a. Owing to this configuration, when the user holds the portion in the vicinity of the center of the main body portion 11 with their hand, the user's thumb and fingers are hidden behind the protruding portion 11a, and hence the user's thumb and fingers are less likely to be captured as one integrated entity with the light emitting portion 12 in an image captured by the image capture apparatus 21. This accordingly prevents a problem that, in analyzing the position of the light emitting portion 12 in the captured image, the information processing apparatus 20 fails to discriminate the light emitting portion 12 from a nail of the user's thumb or finger, which decreases analysis accuracy.

A main button 13, an analog button 15, auxiliary buttons 16a to 16d, a start button 17, a select button 18, and a power button 19 are disposed on an enclosure surface of the main body portion 11. Hereinbelow, description is given of disposition of those buttons.

The main button 13 is disposed, on the front side of the operation device 10, at a position at which the thumb is placed when the user holds the operation device 10 with their hand. Further, the main button 13 is disposed at a bottom of a recessed portion 14 formed at the front of the main body portion 11, and a top surface of the main button 13 is adjacent to a rim portion 14a forming a side surface of the recessed portion 14. Specifically, the top surface of the main button 13 is formed so as to be continuous with the adjacent rim portion 14a, and is positioned lower than the surface of the main body portion 11 which surrounds the recessed portion 14. In this embodiment, the main button 13 corresponds to a first button. The main button 13 is assigned a function associated with an instruction expected to be given particularly frequently by the user. Specifically, examples of such an instruction include a confirmation instruction for confirming the contents of instructions given so far by the user.

The recessed portion 14 has, when viewed from the front of the operation device 10, an approximately rectangular shape with four corners thereof rounded, and a longitudinal direction thereof (that is, long-side direction of a rectangle) coincides with the longitudinal direction of the operation device 10. In addition, the short side of the rectangle has a length which corresponds to a width of a person's thumb, thereby making it easy to place the thumb within the recessed portion 14. The side surface of the recessed portion 14 may be an inclined surface which inclines toward the outside of the recessed portion 14 to form a mortar shape.

Here, excluding the power button 19, the buttons including the main button 13 are disposed, on the side surface of the main body portion 11, in a cylindrical area ranging from a top end of the recessed portion 14 (end on the side of the light emitting portion 12) to a bottom end thereof (end on the side of the bottom). The user holds the narrowed portion in the vicinity of the center of the main body portion 11 by mainly using their palm, middle finger, ring finger, and little finger. Then, the user uses their thumb and index finger to operate the buttons disposed in the cylindrical area between the portion in the vicinity of the center of the main body portion 11 and the light emitting portion 12.

The analog button 15 is disposed on the back side of the operation device 10 (that is, side opposite to the side where the main button 13 is disposed) so as to oppose the main button 13. The user holds the portion in the vicinity of the center of the main body portion 11 and places their thumb onto the main button 13 as described above, and also places their index finger onto the analog button 15. In this case, the thumb and the index finger are in a state of facing each other with the main body portion 11 sandwiched therebetween. The user performs the operation input by depressing the main button 13 and the analog button 15 with their thumb and index finger, respectively. In this embodiment, the analog button 15 corresponds to a second button.

Moreover, instead of simply outputting binary information indicating whether or not the button is depressed by the user, the analog button 15 is capable of detecting to what extent the button is depressed by the user and outputting information indicating the depressed amount. With this configuration, the user can input quantitative information by depressing the analog button 15 lightly or heavily. Note that in order to enable such operation input that corresponds to the depressed amount, the analog button 15 has a larger movable range than the main button 13, and requires a larger stroke amount to be depressed fully than the main button 13.

When the user holds the operation device 10 with their thumb placed on the main button 13, if the main button 13 protrudes from the surface of the main body portion 11, there is a higher risk of the user mistakenly depressing the main button 13 with their thumb. Particularly, in this embodiment, there is a case in which the user performs the operation input by moving the operation device 10 itself in a state where the light emitting portion 12 is emitting light, which is described above. Accordingly, when the user is performing such operation, there is a fear that the user will mistakenly depresses the main button 13. Further, as described above, when the user is holding the main body portion 11, the user's thumb and index finger are placed on the surface of the main body portion 11 so as to oppose each other. In this embodiment, a button (analog button 15) is also provided at the position at which the index finger is to be placed. Further, because the analog button 15 is a device for performing the operation input which corresponds to the depressed amount as described above, the analog button 15 may not be operated constantly with light force and there is a case where the analog button 15 should be depressed with intense force. Accordingly, there is a fear that, when the user attempts to operate the analog button 15, the user may unconsciously move their thumb and mistakenly depresses the main button 13.

Figure 7:
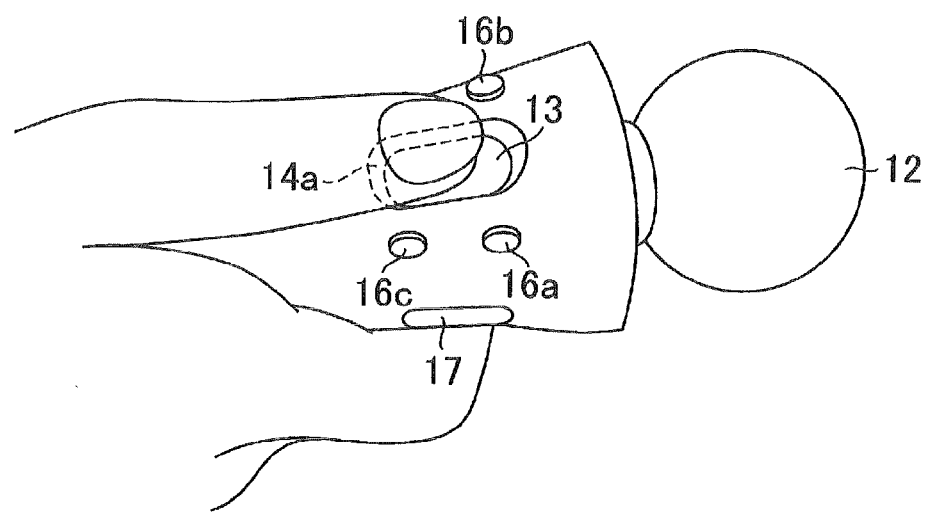
FIG. 7 is a diagram illustrating a situation in which a user is holding the operation device according to the embodiment of the present invention.

In view of this, in this embodiment, as described above, the main button 13 is disposed at the bottom of the recessed portion 14 so that the top surface of the main button 13 is located adjacent to the rim portion 14a. When the user holds the operation device 10, the user puts their thumb across a portion in which the main button 13 is adjacent to the rim portion 14a in such a manner that the thumb rests on the rim portion 14a. FIG. 7 is a diagram illustrating a situation in which the user is holding the main body portion 11 as described above. If the user holds the main body portion 11 as described above, the user only needs to apply force toward the rim portion 14a with their thumb when the user depresses the analog button 15. Consequently, the user can operate the analog button 15 with an arbitrary force without mistakenly operating the main button 13. Further, because the user places their thumb on the main button 13, the user does not need to shift their thumb significantly in operating the main button 13.

In particular, in a case where the user places their thumb along the longitudinal direction of the recessed portion 14, a movement of the thumb in operating the main button 13 is also made along this longitudinal direction. Therefore, of the side surfaces of the recessed portion 14, surfaces perpendicular to the longitudinal direction of the recessed portion 14 (that is, surfaces along the short sides of the rectangle) function as the rim portion 14a on which the user's thumb is placed. Note that if the rim portion 14a has an inclined surface toward the outside of the recessed portion 14 as described above, it becomes easier for the user to place their thumb over the rim portion 14a and the main button 13. Here, in this embodiment, the top surface of the main button 13 and the rim portion 14a are formed in a continuous manner, but as long as the top surface of the main button 13 and the rim portion 14a are close enough to each other for the user to be able to place their thumb across the main button 13 and the rim portion 14a, there may be a gap therebetween.

Around the recessed portion 14, the four auxiliary buttons 16a to 16d are disposed so as to surround the main button 13. Specifically, those auxiliary buttons 16a to 16d are used for various kinds of operation input along with the main button 13 during execution of an application program such as a game application program. Each of the auxiliary buttons 16a to 16d is disposed at a position which corresponds to one of the ends of the recessed portion 14 formed in the rectangular shape in the longitudinal direction. Specifically, the auxiliary buttons 16a and 16b are disposed at positions displaced rightward and leftward (that is, directions substantially perpendicular to the longitudinal direction of the recessed portion 14), respectively, from the upper end (end on the side of the light emitting portion 12) of the recessed portion 14. Similarly, the auxiliary buttons 16c and 16d are disposed at positions displaced rightward and leftward, respectively, from the lower end (end on the side of the bottom) of the recessed portion 14. The user can recognize the positions of both ends of the recessed portion 14 in the longitudinal direction by touching the rim portion 14a with their thumb placed within the recessed portion 14. Accordingly, by shifting the thumb laterally from the position of one of the two ends of the recessed portion 14 to the position of an auxiliary button which the user desires to operate, it is possible for the user to move their thumb and operate the auxiliary button with ease without actually taking a look at the operation device 10 to check. In other words, the rim portion 14a serves to prevent the user from performing erroneous operation with respect to the main button 13 by enabling the user's thumb to be placed on the rim portion 14a along with the main button 13 as described above, and also functions as a guide portion when the user feels for the auxiliary buttons. In particular, when the user displaces their thumb along the longitudinal direction of the recessed portion 14, the user can recognize the positions of the both ends of the recessed portion 14 by touching, of the side surfaces of the recessed portion 14, the surfaces perpendicular to the longitudinal direction of the recessed portion 14 (that is, surfaces along the short sides of the rectangle). As a result, the side surface of the recessed portion 14 which is formed in such a direction functions as the guide portion for the user to recognize the positions of the auxiliary buttons.

Here, the auxiliary buttons 16c and 16d disposed at the positions corresponding to the lower end (end closer to the portion at which the user holds the main body portion 11) of the recessed portion 14 are disposed at positions relatively closer to the recessed portion 14, compared to the auxiliary buttons 16a and 16b disposed at the positions corresponding to the end farther from the portion at which the user holds the main body portion 11. With this configuration, for example, the user can operate the auxiliary button 16a by swinging their thumb from the main button 13 to the same extent as a case where the user operates the auxiliary button 16c.

The start button 17 and the select button 18 are used for starting a game, selecting a game, pausing, or the like during execution, for example, of a game application program. For this reason, in general, those buttons are not used frequently during the execution of a game. Accordingly, in this embodiment, those two buttons are disposed on the right side surface and the left side surface of the main body portion 11, respectively. Specifically, the start button 17 and the select button 18 are disposed, in a cross section perpendicular to the longitudinal direction of the main body portion 11, so as to oppose each other on a line substantially perpendicular to a line connecting the main button 13 and the analog button 15. With this configuration, when the user holds the operation device 10 by placing their thumb and finger at the positions of the main button 13 and the analog button 15, respectively, the positions of the start button 17 and the select button 18 are located away from the positions at which the user's thumb and finger are placed. Therefore, the fear of the user mistakenly depressing the start button 17 or the select button 18 during the execution of the application program can be reduced.

In addition, upper ends of both the start button 17 and the select button 18 are substantially identical in height to upper ends of the main button 13 and the analog button 15. With this configuration, along an upper end of a cylindrical area in which the buttons are disposed, the upper ends of the main button 13, the analog button 15, the auxiliary buttons 16a and 16b, the start button 17, and the select button 18 are aligned on substantially the same straight line. Therefore, by rotating the main body portion 11 in the palm or moving the thumb or the index finger significantly, similarly to the case of the auxiliary buttons 16a and 16b, the user can operate the start button 17 and the select button 18 without directly taking a look at the button to check its position.

The power button 19 is disposed, at the front of the main body portion 11, below the position at which the main button 13 is disposed. The power button 19 is used for powering on the operation device 10 to start operation thereof or powering off the operation device 10 to terminate the operation. In other words, unlike the other buttons, the power button 19 is not operated during the execution of the application program or the like.

Further, on the bottom side of the main body portion 11 (that is, side opposite to the side where the light emitting portion 12 is attached), there is provided a universal serial bus (USB) connector (not shown) which is compliant with the USB standard. In addition, a portion surrounding the USB connector is provided with a removable cover, and the inside of the portion which is exposed by removing the cover is provided with extension connectors for connecting other equipment. Further, the cover is provided with a through hole through which a string such as a strap is passed.

Here, as described above, the main body portion 11 is incurved toward the vicinity of the center thereof, and the protruding portions 11a and 11b are formed at both ends thereof. Therefore, when the operation device 10 is laid on its side on a floor surface, the protruding portions 11a and 11b come into contact with the floor surface, and a portion therebetween is not brought into direct contact with the floor surface. Further, the analog button 15, the auxiliary buttons 16a to 16d, and the like may be formed so that heights thereof do not exceed a curved surface formed by connecting the perimeters of the protruding portions 11a and 11b to each other. With this configuration, as well as the main button 13 formed inside the recessed portion 14, the other buttons are also prevented from being mistakenly depressed when the operation device 10 is laid on its side on the floor.

According to the embodiment of the present invention described above, when the user holds the operation device 10 between their thumb and other fingers, the user holds the operation device 10 with their thumb and finger placed on the main button 13 and the analog button 15, respectively. By doing so, the user does not need to move their thumb or fingers significantly every time the user operates those buttons, which results in easier operation. In addition, the main button 13 is disposed so that the main button 13 is adjacent to the rim portion 14a which forms, inside the recessed portion 14, the side surface of the recessed portion 14. Therefore, even when the user holds the operation device 10 with their thumb placed on the main button 13, the user can be prevented from mistakenly operating the main button 13.

Here, in the description given above, the main button 13 to be operated with the thumb is disposed inside the recessed portion 14, but the present invention is not limited thereto. A button to be operated with another finger may be disposed inside a recessed portion formed on the enclosure surface of the operation device 10.

While there have been described what are at present considered to be certain embodiments of the invention, it will be understood that various modifications may be made thereto, and it is intended that the appended claims coverall such modifications as fall within the true spirit and scope of the invention.

What is claimed is:

1. An operation device to be held by a user with one hand when used, comprising:
    a light emitting portion which is attached at one end of the operation device and is used to identify a position of the operation device;
    an elongate recessed portion formed at a position at which at least one of a thumb and fingers is placed when the user holds the operation device;
    a first button which is disposed at a bottom of the recessed portion and has a top surface adjacent to a rim portion forming a side surface of the recessed portion, such that the user manipulates the first button with his thumb;
    a second button disposed at a position opposite to the first button such that the user manipulates the second button with his index finger and a main body of the operation device is sandwiched between the user's thumb and index finger; and
    further buttons disposed adjacent to at least one end of the elongate recessed portion,
    wherein the elongate recessed portion is positioned such that:(i) a longer dimension of the elongate recessed portion defines a longitudinal direction extending generally through the light emitting portion and the first button, (ii) a shorter dimension of the elongate recessed portion defines a lateral direction, substantially perpendicular to the longitudinal direction, and (iii) an area circumscribed by the elongate recessed portion defines a normal direction extending substantially perpendicularly from the elongate recessed portion, and substantially perpendicularly from both the longitudinal direction and the lateral direction,
    wherein the second button is disposed at the position opposite to, and substantially in the normal direction from, the first button, and
    wherein the further buttons include a first pair of buttons, the first pair of buttons being disposed on respective sizes of the elongate recessed portion.

2. The operation device according to claim 1, wherein the second button comprises a button capable of detecting an amount by which the second button is depressed by the user.

3. The operation device according to claim 1, wherein the first pair of buttons is disposed adjacent to, and offset in the lateral direction from, a first end of the elongate recessed portion, and the further buttons include a second pair of buttons disposed adjacent to, and offset in the lateral direction from, a second, opposing end of the elongate recessed portion.

4. The operation button according to claim 3, wherein the first pair of buttons includes one button disposed adjacent to, and offset in the lateral direction from, one lateral side of the first end of the elongate recessed portion, and an opposite button disposed adjacent to, and offset in the lateral direction from, an opposing lateral side of the first end of the elongate recessed portion.

5. The operation button according to claim 4, wherein the second pair of buttons includes one button disposed adjacent to, and offset in the lateral direction from, one lateral side of the second end of the elongate recessed portion, and an opposite button disposed adjacent to, and offset in the lateral direction from, an opposing lateral side of the second end of the elongate recessed portion.

6. The operation device according to claim 5, each of the first pair of buttons is disposed farther from the first button than each of the second pair of buttons.

7. The operation device according to claim 1, wherein each button included in the further buttons protrudes from an enclosure surface of the operation device.

8. The operation device according to claim 1, wherein each button included in the further buttons is smaller than the first button.

9. An operation device to be held by a user with one hand when used, comprising:
- a light emitting portion which is attached at one end of the operation device and is used to identify a position of the operation device;
- an elongate recessed portion formed at a position at which at least one of a thumb and fingers is placed when the user holds the operation device;
- a first button which is disposed at a bottom of the recessed portion and has a top surface adjacent to a rim portion forming a side surface of the recessed portion, such that the user manipulates the first button with his thumb; and
- a second button disposed at a position opposite to the first button such that the user manipulates the second button with his index finger and a main body of the operation device is sandwiched between the user's thumb and index finger;

wherein the elongate recessed portion is positioned such that: (i) a longer dimension of the elongate recessed portion defines a longitudinal direction extending generally through the light emitting portion and the first button, (ii) a shorter dimension of the elongate recessed portion defines a lateral direction, substantially perpendicular to the longitudinal direction, and (iii) an area circumscribed by the elongate recessed portion defines a normal direction extending substantially perpendicularly from the elongate recessed portion, and substantially perpendicularly from both the longitudinal direction and the lateral direction, wherein the second button is disposed at the position opposite to, and substantially in the normal direction from, the first button.

* * * * *